United States Patent [19]

Vitale et al.

[11] Patent Number: 4,851,810
[45] Date of Patent: Jul. 25, 1989

[54] LIGHT CLUSTER FOR AN AUTOMOBILE

[75] Inventors: Carmelo Vitale, Mozzate; Ezio Villa, Arese, both of Italy

[73] Assignee: Alfa Lancia Industriale S.p.A., Arese, Italy

[21] Appl. No.: 230,198

[22] Filed: Aug. 9, 1988

[30] Foreign Application Priority Data

Sep. 4, 1987 [IT] Italy .............................. 22265/87[U]

[51] Int. Cl.$^4$ .............................................. B60Q 1/26
[52] U.S. Cl. ..................................... 362/240; 40/204; 340/468; 362/61; 362/83.2
[58] Field of Search ....................... 340/93, 99, 91, 87, 340/100, 110, 84; 362/61, 80; 40/204

[56] References Cited

U.S. PATENT DOCUMENTS

| 1,887,087 | 11/1932 | Frizner | 40/204 |
| 2,104,539 | 1/1938 | Häcker | 40/204 |
| 3,487,206 | 12/1969 | Dawson et al. | 362/80 |

FOREIGN PATENT DOCUMENTS

| 647133 | 6/1937 | Fed. Rep. of Germany . | |
| 2627842 | 12/1977 | Fed. Rep. of Germany . | |
| 2811286 | 9/1979 | Fed. Rep. of Germany | 362/61 |
| 1053913 | 2/1954 | France . | |
| 1357769 | 3/1964 | France . | |
| 2470709 | 6/1981 | France . | |
| 2557046 | 12/1984 | France . | |
| 2091864 | 8/1982 | United Kingdom | 362/61 |

Primary Examiner—Joseph A. Orsino
Assistant Examiner—Hollis T. Chen
Attorney, Agent, or Firm—Charles E. Brown; Charles A. Brown

[57] ABSTRACT

An automobile light cluster, particularly a rear light cluster, formed from a central unit and two side units, where the central unit (12) comprises a base (16) having a structure in the form of cells aligned along a substantially horizontal axis (22), with at least one central cell (18) arranged to house at least one number plate light, and with at least one pair of flanking cells (19 and 20) forming the reversing and rear fog lights. The central unit (12) comprising for the base (16) a cover (15) formed from a single semitransparent sheet which is coupled with suitably colored inner walls (28), at least in correspondence with the central cell (18).

7 Claims, 4 Drawing Sheets

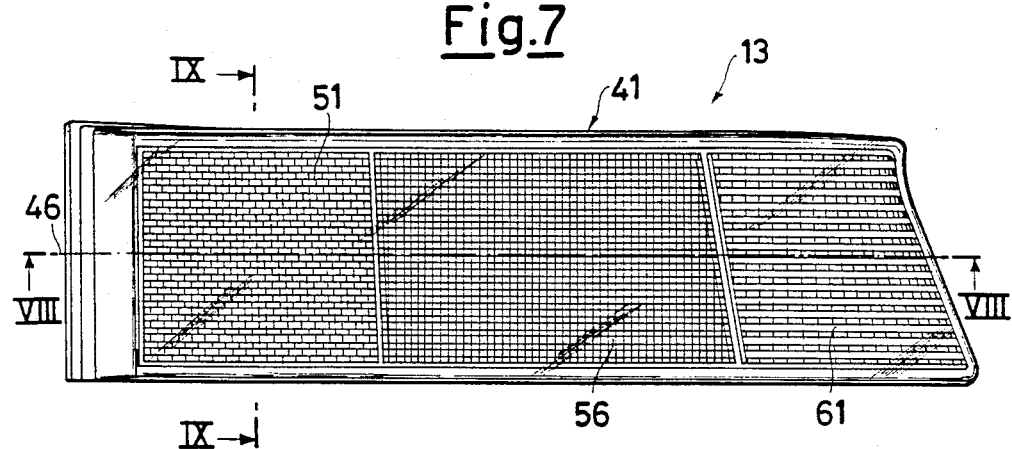
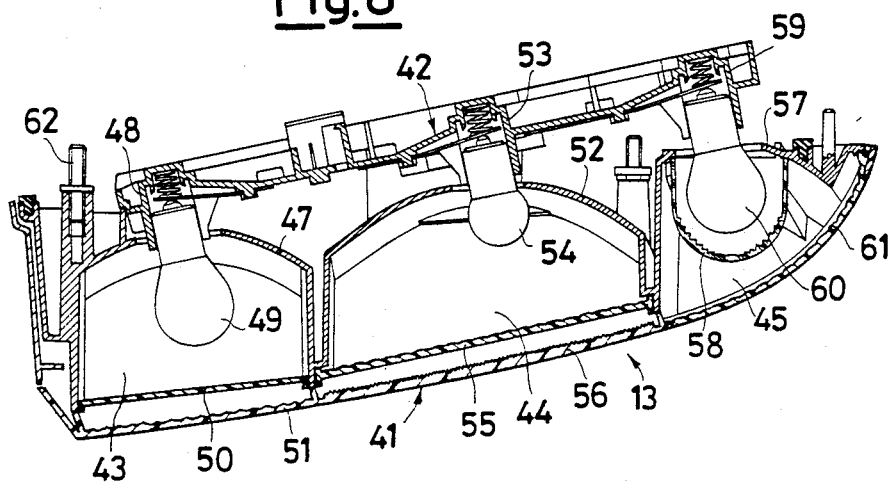
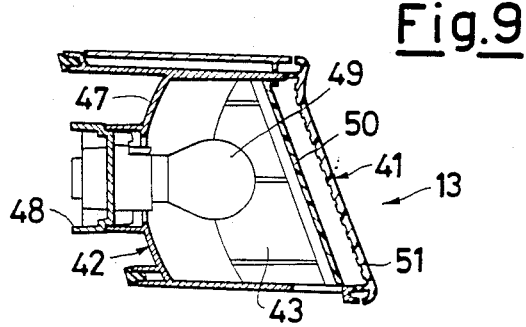

LIGHT CLUSTER FOR AN AUTOMOBILE

This invention relates to a light cluster for an automobile, and in particular a rear light cluster formed from a central unit and two side units, within which the various lights are grouped. In the formation of automobile light systems, the tendency is to group together the rear lights, especially tail lights, stop lights and direction indicators, and often also the number plate light and reversing and rear fog lights, in order to simplify their mounting on the automobile body and to limit manufacturing costs at least to a certain degree.

In choosing the most ideal solution, it is not always easy to satisfy these requirements while at the same time satisfying functionality and aesthetic criteria.

The object of the present invention is to provide a light cluster which combines considerable functionality characteristics with special aesthetic qualities.

The light cluster according to the invention is formed from a central unit and two side units, and is characterised in that the central unit comprises a base having a structure in the form of cells aligned along a substantially horizontal axis, with at least one central cell arranged to house at least one number plate light, and with at least one pair of flanking cells forming the reversing and rear fog lights, said central unit comprising for said base a cover formed from a single semitransparent sheet which is coupled with suitably coloured inner walls, at least in correspondence with said central cell.

According to a preferred embodiment of the light cluster, each side unit also has a base with a structure in the form of cells aligned along a substantially horizontal axis which is at least substantially parallel to that of the central unit, each side unit comprising at least three side-by-side cells forming the stop lights, tail lights and direction indicator lights, each side unit also comprising for the relative base a cover formed from a single semitransparent sheet.

Again according to a preferred embodiment, the semitransparent sheet cover for the central unit has a height substantially equal to the height of the semitransparent sheet cover of the side units.

The result is a light cluster in which the individual lights are disposed in sucession and are framed upperly and lowerly by the sheet metal of the automobile body, so that they are well visible and evident when in operation.

In contrast, when the individual lights are not in operation, the light cluster appears as a wide fascia of the desired colour, which embraces the automobile body, for example the tail, with a very pleasing and elegant aesthetic effect.

Characteristics and advantages of the invention are illustrated hereinafter with reference to the accompanying FIGS. 1 to 9, which show a preferred embodiment of the invention by way of nonlimiting example.

FIG. 7 is an enlarged front view of a side unit of the light cluster of FIG. 1.

FIG. 8 is a section on the line VII—VII of FIG. 7.

FIG. 9 is a section on the line IX—IX of FIG. 7.

Figure 1:
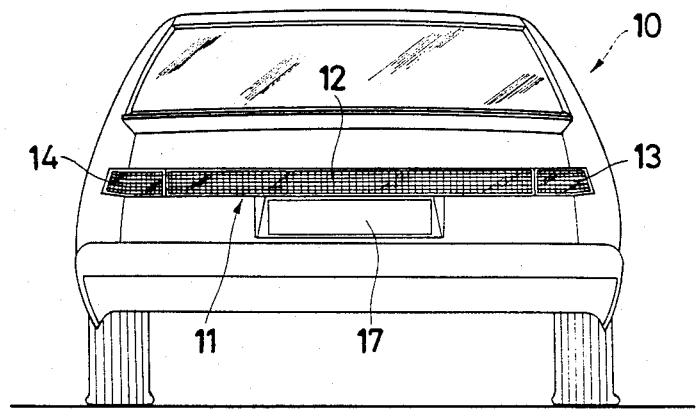
FIG. 1 is a view of the rear end of an automobile provided with a rear light cluster constructed in accordance with the invention.

In FIG. 1, the reference numeral 10 indicates overall the rear end or tail of an automobile provided with a rear light cluster indicated overall by 11 and formed from a central unit 12, a right side unit 13 and a left side unit 14.

Figure 2:
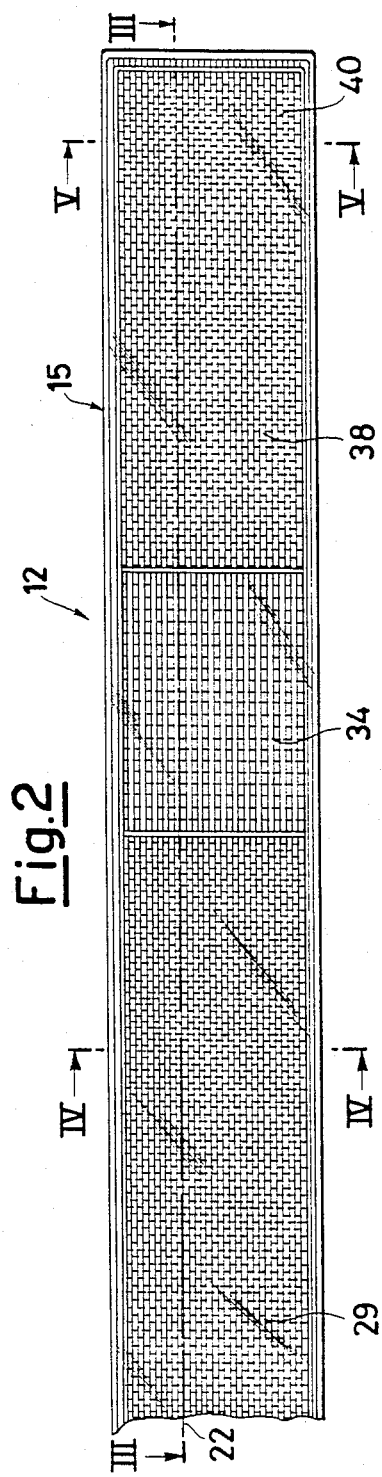
FIG. 2 is an enlarged partial front view of one half of the central unit of the light cluster of FIG. 1.
Figure 3:
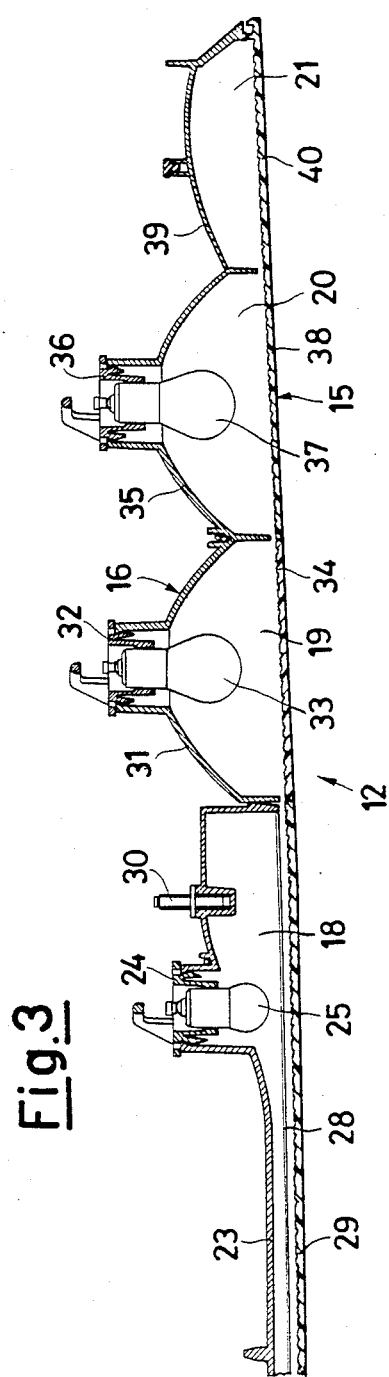
FIG. 3 is a section on the line III—III of FIG. 2.

FIG. 1 also shows the number plate housing, indicated by 17. FIGS. 2 and 3 show the right half of the central uint 12 of the light cluster 11. The left half, not shown, is symmetrical. The reference numeral 15 indicates overall a cover for the light cluster central unit 12, this cover being formed from a single semitransparent sheet, for example of methacrylate.

The cover 15 is welded to a base, visible in FIG. 3 and indicated overall by 16.

The base 16 is composed of a series of cells of which the central cell is indicated by 18 and those which flank it by 19, 20, 21. The cells 18-21 are aligned along a substantially horizontal axis, indicated by 22 in FIG. 2, which joins together the centres of the lights bulbs.

Figure 4:
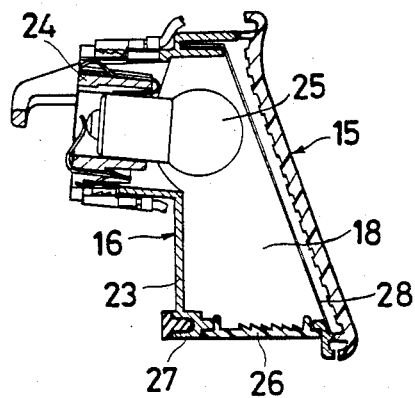
FIG. 4 is a section on the line IV—IV of FIG. 2.

The cell 18 houses the number plate light and is therefore provided with a rear wall 23, which supports a bulb holder 24 and a bulb 25 also shown in FIG. 4.

Figure 6:
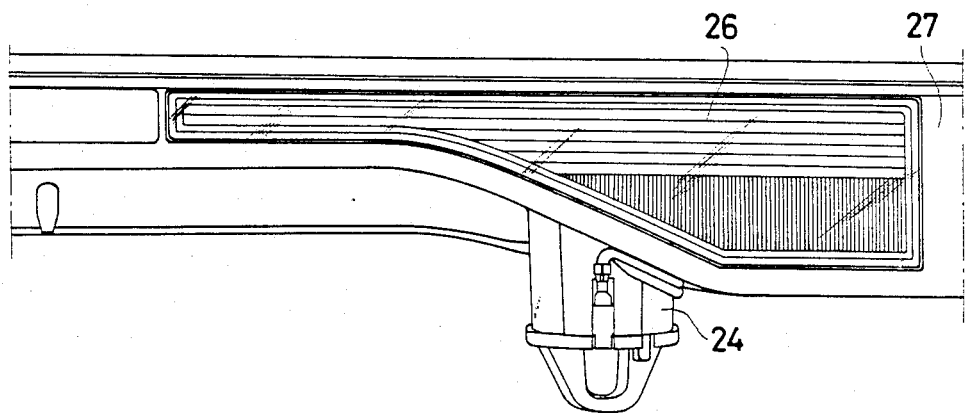
FIG. 6 is an enlarged partial view from below of the light cluster of FIG. 1.

A transparent diffracting element for the bulb 25, visible in FIGS. 4 and 6 where it is indicated by 26, is located in a lower wall 27 of the cell 18.

The cell 18 is closed at its front by a screen 28 which has a polished inner wall for reflecting the light and is located within a bay 29 of the cover 15.

The purpose of the screen 28 is to direct light from the bulb 25 towards the transparent diffracting element 26. The screen 28 also has an aesthetic function because it can be painted on its outer surface with a colour suitable for giving the required tonality to the colour of the cover 15, which can for example be red.

In FIG. 3 the reference numeral 30 indicates one of the screws used for fixing the unit 12 to the sheet metal of the automobile tail 10, for example to the lid or to a wall of the boot.

The cell 19 forms a reversing light and comprises a reflector 31, a bulb holder 32, a bulb 33 and a corresponding bay 34 of the cover 15 forming the transparent diffracting element for its light.

The bay 34 is preferably in the form of strips which are alternately colourless and of the colour chosen for the cover 15, for example red, and is moulded into the sheet forming the cover 15.

The cell 20 forms a rear fog light and comprises a reflector 35, a bulb holder 36, a bulb 37, and a corresponding bay 38 in the cover 15 forming a transparent diffracting element for its light. the bay 38 is preferably red, as is the bay 29.

Figure 5:
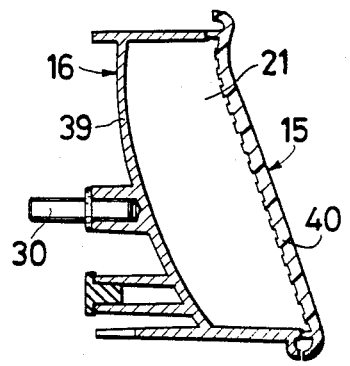
FIG. 5 is a section on the line V—V of FIG. 2.

The cell 21 has a joining function and comprises a rear wall 39 and a corresponding bay 40 of the cover 15, these being also visible in FIG. 5.

The wall 39 can be painted on its inner surface with a colour suitable for giving the required tonality to the surface of the cover 15, which can for example be red.

In FIG. 7, the reference numeral 41 indicates a cover for the side unit 13 of the light cluster 11, and formed from a single semitransparent sheet, for example of methacrylate, having a height practically equal to that of the cover 15 for the unit 12. The cover 41 is welded to a base, visible in FIG. 8 and indicated overall by 42.

The base 42 comprises a series of three cells indicated by 43, 44, 45.

The cells are aligned along a substantially horizontal axis, indicated by 46 in FIG. 7, and joining together the centres of the light bulbs, it being substantially parallel to the axis 22 of FIG. 2 when the light cluster 11 is mounted to the automobile tail 10, with the end cells of the side units 13 and 14, such as the cell 43, positioned in contact with the end cells, such as the cell 21, of the central unit 12.

The horizontal axis 46 is practically aligned with the central horizontal axis, not shown, of the cover 15.

The cell 43 forms a stop light, and comprises a reflector 47, a bulb holder 48, a bulb 49, a semitransparent screen 50 for diffusing the light from said bulb, and shown also in FIG. 9, and a corresponding bay 51 of the cover 41, forming the transparent diffracting element for its light.

The bay 51 is preferably red in colour.

The cell 44 forms a tail light, and comprises a reflector 52, a bulb holder 53, a bulb 54, a reflex reflecting baffle 55 and a corresponding bay 56 of the cover 41, forming the transparent diffracting element for its light.

The bay 56 is also preferably red in colour.

The cell 45 forms a direction indicator light and comprises a wall 57, which supports an orange-coloured semitransparent cup 58, a bulb holder 59, a bulb 60 and a corresponding bay 61 of the cover 41, forming the transparent diffracting element for its light. The bay 61 preferably comprises strips which are alternately colourless and, for example, coloured red, to allow the orange light to filter through, it being moulded into the sheet forming the cover 41.

The reference numeral 62 indicates one of the screws used for fixing the unit 13 of the sheet metal of the automobile tail 10, for example to a wall of the boot.

In the described light cluster 11, the cells 18-21 of the unit 12 and the cells 43-45 of the units 13 and 14 are substantially of rectangular parallelepiped shape.

As can be seen from the figures, the individual lights are grouped in succession within the units 12, 13, 14, which appear as a single elongated light cluster 11 framed by the sheet metal of the tail 10. They are therefore well visible and identifiable when in operation.

The result is also aesthetically pleasing, because the light cluster 11 appears as a wide fascia embracing the automobile tail 10, and is of practically uniform colour, such as brilliant red.

We claim:

1. An automobile light cluster, particularly a rear light cluster, formed from a central unit and two side units, characterised in that the central unit (12) comprises a base (16) having a structure in the form of cells aligned along a substantially horizontal axis (22), with at least one central cell (18) arranged to house at least one license number plate light, and with at least one pair of flanking cells (19 and 20) forming the reversing and rear fog lights, and base (16) of said central unit (12) having a cover (15) formed from a single semitransparent sheet which is coupled with suitably coloured inner walls (28), covering at least said central cell (18).

2. A light cluster as claimed in claim 1, characterised in that each side unit (13 and 14) also has a base (42) with a structure in the form of cells aligned along a substantially horizontal axis (46) which is at least substantially parallel to that (22) of the central unit (12), each side unit (13 or 14) comprising at least three side-by-side cells (43, 44, 45) forming the stop lights, tail lights and direction indicator lights, each side unit also having a cover (41) for its relative base (42) formed from a single semitransparent sheet.

3. A light cluster as claimed in claim 2, characterised in that the semitransparent sheet cover (15) of the central unit (12) has a height substantially equal to the height of the semitransparent sheet cover (41) of the side units (13 and 14).

4. A light cluster as claimed in claim 1, characterised in that said central cell (18) of the central unit (12) is closed at its front by a screen (28) having a polished inner wall and located internal to its cover (15) in order to direct the light from the number plate light towards a transparent diffracting element (26), and being painted on its outer surface with a colour suitable for providing the required tonality to the colour of the cover of said central unit (12).

5. A light cluster as claimed in claim 1, characterised in that said base (16) of the central unit (12) has at least one cell (21) having a joining function and provided with a rear wall (39) which is painted on its inner surface with a colour suitable for providing the required tonality to the colour of the cover (15) of said central unit (12).

6. A light cluster as claimed in claim 2, characterised in that each side unit (13 and 14) has that cell (43) forming the stop light closed at its front by a semitransparent screen (50) provided for diffusing the light and located internal to the relative cover (41).

7. A light cluster as claimed in claim 1, characterised in that the cells (18-21) of the central unit (12) and the cells (43-45) of the side units (13 and 14) are substantially of rectangular parallelepiped shape.

* * * * *